(12) United States Patent
Deshpande (10) Patent No.: US 9,058,622 B2
(45) Date of Patent: *Jun. 16, 2015

(54) WIRELESS EMAIL COMMUNICATIONS SYSTEM PROVIDING RESOURCE UPDATE TRACKING FEATURES AND RELATED METHODS

(75) Inventor: Nikhil Deshpande, Issaquah, WA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,547

(22) Filed: Sep. 11, 2012

(65) Prior Publication Data

US 2013/0007246 A1 Jan. 3, 2013

Related U.S. Application Data

(63) Continuation of application No. 11/734,946, filed on Apr. 13, 2007, now Pat. No. 8,316,141.

(51) Int. Cl.
*G06F 15/16* (2006.01)
*G06Q 30/06* (2012.01)

(52) U.S. Cl.
CPC ..................... *G06Q 30/06* (2013.01)

(58) Field of Classification Search
CPC ..... H04L 67/16; H04L 69/24; G06F 11/3013; G06F 9/4448
USPC ................................. 709/227, 229
See application file for complete search history.

(56) References Cited

U.S. PATENT DOCUMENTS

| 7,480,696 | B2 | 1/2009 | Kirkland et al. |
| 2002/0087534 | A1* | 7/2002 | Blackman et al. ................. 707/4 |
| 2003/0220883 | A1* | 11/2003 | Block et al. ..................... 705/59 |
| 2005/0149922 | A1 | 7/2005 | Vincent |
| 2005/0243778 | A1* | 11/2005 | Wang et al. .................. 370/338 |
| 2005/0289266 | A1* | 12/2005 | Illowsky et al. .............. 710/104 |
| 2006/0117010 | A1* | 6/2006 | Hakala .............................. 707/9 |
| 2007/0067373 | A1 | 3/2007 | Higgins et al. |
| 2007/0226608 | A1* | 9/2007 | Virk et al. ..................... 715/513 |

FOREIGN PATENT DOCUMENTS

WO 2007040642 4/2007

\* cited by examiner

*Primary Examiner* — Wing F Chan
*Assistant Examiner* — Andrew Woo
(74) *Attorney, Agent, or Firm* — Steven M. Greenberg, Esq.; CRGO Law (57) ABSTRACT

A wireless communications system may include a plurality of mobile wireless communications devices to permit users to send and receive wireless electronic mail (email) messages. Each device may be enabled for email communication based upon user acceptance of terms and conditions (T&Cs) in a corresponding user selected language and in a corresponding version at a time of acceptance. The system may further include a resource deployment server which may include a database module for storing the corresponding user selected language and version for the accepted T&Cs for each user. The resource deployment server may also include a service module cooperating with the database module for enabling user review of the accepted T&Cs in the corresponding user selected language and version thereof, and independent of any subsequent change in the user selected language of a given mobile wireless communications device and independent of any subsequent change in version of the T&Cs.

18 Claims, 7 Drawing Sheets

WIRELESS EMAIL COMMUNICATIONS SYSTEM PROVIDING RESOURCE UPDATE TRACKING FEATURES AND RELATED METHODS

RELATED APPLICATION

This application is a continuation of pending Ser. No. 11/734,946 filed Apr. 13, 2007, the entire disclosure of which is hereby incorporated herein by reference.

FIELD OF THE INVENTION

The present invention relates to the field of communications systems, and, more particularly, to wireless electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails stored in source mailboxes of different email storage servers (e.g., corporate email storage server, Yahoo, Hotmail, AOL, etc.).

As wireless communications networks bring on-line increasing numbers of devices that send and receive wireless emails, the ability to update network resources without interruption to network service becomes more challenging. This is particularly true as wireless LAN and cellular communications capabilities continue to expand and reach new countries and regions, as email service resources then have to be provided in multiple language formats. Moreover, it also becomes challenging for email distribution systems which may route messages to and from many different wireless communications networks to deploy updated language or other content across different network platforms.

Various attempts have been made in the prior art to more readily facilitate updating software resources between different computer systems. By way of example, U.S. Patent Publication No. 2005/0149922 is directed to a dynamic software update system in which a subscription request is sent to a publish/subscribe server for receiving updates to the computer application. An update notification or an update is received from the publish/subscribe server, and the update is dynamically applied to the computer application during execution without restarting the computer application. In one embodiment, the update notification is received from the publish/subscribe server, a request for the update is sent to a second server, and the update is received from the second server.

While such systems may be advantageous for relatively straightforward computer software updates, further resource deployment capabilities may be required when updating different types of content across multiple network platforms, for example. Moreover, better approaches for tracking the various versions of resources and documents deployed across multiple platforms and to numerous users may also be desirable in some instances.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a plurality of mobile wireless communications devices to permit users to send and receive wireless electronic mail (email) messages. Each wireless communications device may be enabled for email communication based upon user acceptance of terms and conditions (T&Cs) in a corresponding user selected language and in a corresponding version at a time of acceptance. The system may further include a resource deployment server which may include a database module for storing the corresponding user selected language and version for the accepted T&Cs for each user. The resource deployment server may also include a service module cooperating with the database module for enabling user review of the accepted T&Cs in the corresponding user selected language and version thereof, and independent of any subsequent change in the user selected language of a given mobile wireless communications device and independent of any subsequent change in version of the T&Cs.

More particularly, the service module may further present new versions of T&Cs to users via respective wireless communications devices for acceptance thereof, and update the database module based thereon. In addition, the database module may also be for storing a corresponding time of acceptance for the T&Cs for each user, and the service module may also enable user review of the corresponding time of acceptance.

Furthermore, the service module may deploy the T&Cs in respective resource deployment packages (RDP) for different languages. Moreover, the system may further include at least one wireless network over which the wireless communications devices communicate, and each RDP may further include deployment instructions for deploying the respective T&Cs over the at least one wireless communications network.

The resource deployment server may further comprise at least one proxy module for interfacing with the at least one wireless communications network. Further, the resource deployment server may also include a World Wide Web Distributed Authoring and Versioning (WebDAV) interface for communicating with the at least one proxy module. By way of example, at least some of the mobile wireless communications device comprise cellular devices.

A related resource deployment server is for use with a plurality of mobile wireless communications devices permitting users to send and receive wireless electronic mail (email) messages, where each wireless communications device may be enabled for email communication based upon user acceptance of terms and conditions (T&Cs) in a corresponding user selected language and in a corresponding version at a time of acceptance. The resource deployment server may include a database module for storing the corresponding user selected language and version for the accepted T&Cs for each user. The server may further include a service module cooperating with the database module for enabling user review of the accepted T&Cs in the corresponding user selected language and version thereof and independent of any subsequent change in the user selected language of a given wireless communications device and independent of any subsequent change in version of the T&Cs.

A related wireless communications method aspect may include providing a plurality of mobile wireless communications devices, such as those described above. The method may further include storing the corresponding user selected language and version for the accepted T&Cs for each user in a database module, and enabling user review of the accepted T&Cs in the corresponding user selected language and version thereof and independent of any subsequent change in the user selected language of a given wireless communications device and independent of any subsequent change in version of the T&Cs.

Figure 1:
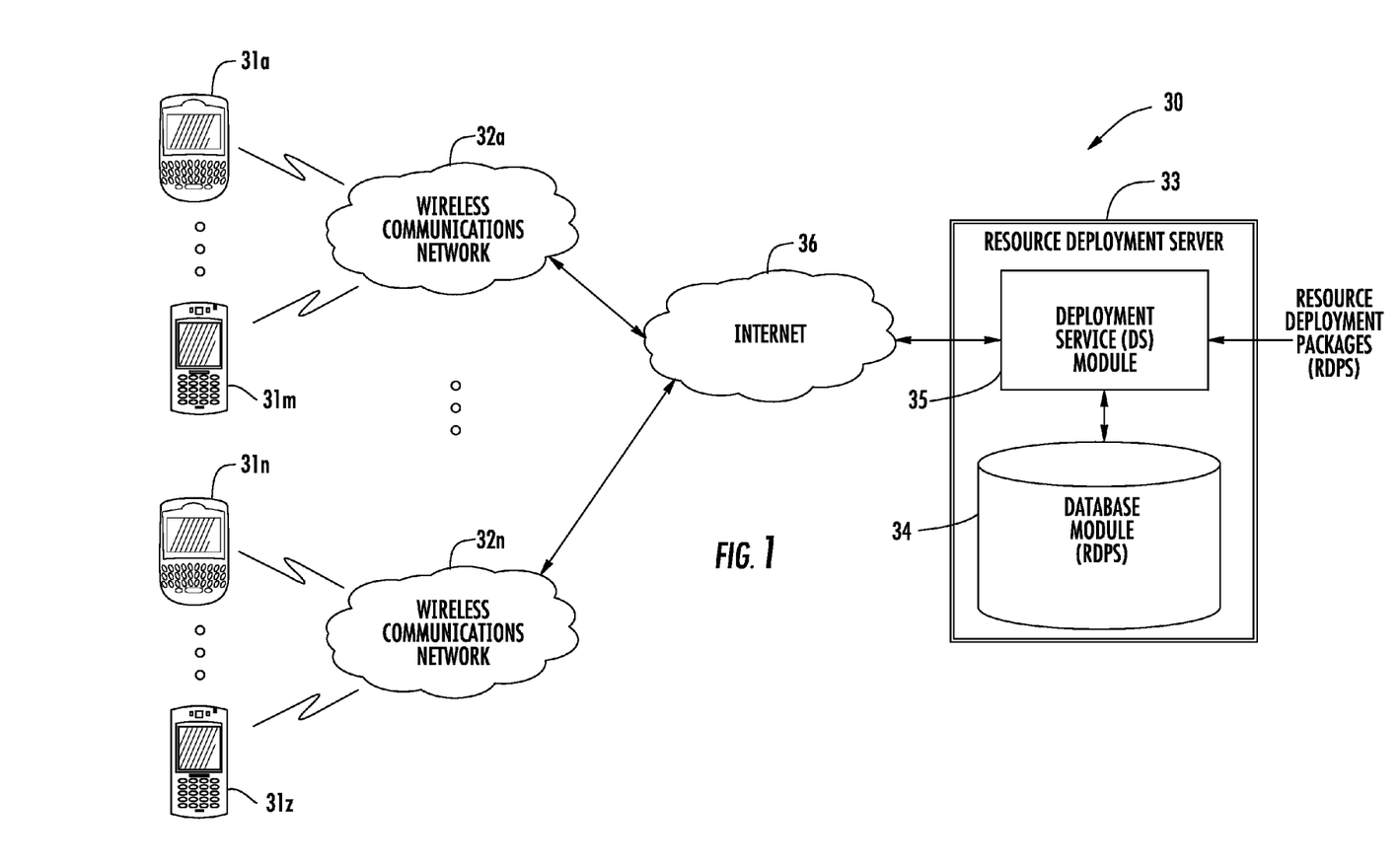
FIG. 1 is a schematic block diagram of a wireless communications systems in accordance with the present invention.

Referring initially to FIG. 1, a wireless communications system 30 illustratively includes a plurality of wireless communications networks 32a, 32n, and a respective plurality of mobile wireless communications devices 31a-31m, 31n-31z for sending and receiving wireless electronic mail (email) messages over the wireless communications networks. More particularly, in the cellular communications context, each wireless communications network 32 corresponds to a cellular carrier network (e.g., TMobile, Cingular, Verizon, etc.), and may include not only the wireless communications infrastructure (cell towers, etc.), but also the "fixed" infrastructure for interfacing landline (e.g., PSTN) phone networks, email relay systems (e.g., via the Internet/WWW), etc., as will be appreciated by those skilled in the art. However, in some implementations the wireless communications networks may be wireless local area networks (LANs), etc., as will be appreciated by those skilled in the art. By way of example, the mobile wireless cellular communications devices 31a-31m, 31n-31z may be phones or personal digital assistant (PDA) devices which are able to send/receive emails over respective networks 32a, 32n, as will also be appreciated by those skilled in the art.

The system 30 further illustratively includes a resource deployment server 33. The resource deployment server 33 illustratively includes a database module 34 and one or more deployment service (DS) modules 35 cooperating therewith for storing a plurality of resource deployment packages (RDPs), and deploying the RDPs to the wireless communications networks 32a-32n. By way of example, the resource deployment server 33 may interface with the wireless communications networks 32a-32n via a wide area network, such as the Internet 36.

In particular, each RDP includes deployment content and deployment instructions therefor relating to sending and receiving email messages, as will be discussed further below. The DS module 35 dynamically deploys RDPs to the wireless communications networks to update deployment content thereof based upon the respective deployment instructions, as will also be discussed further below.

Figure 2:
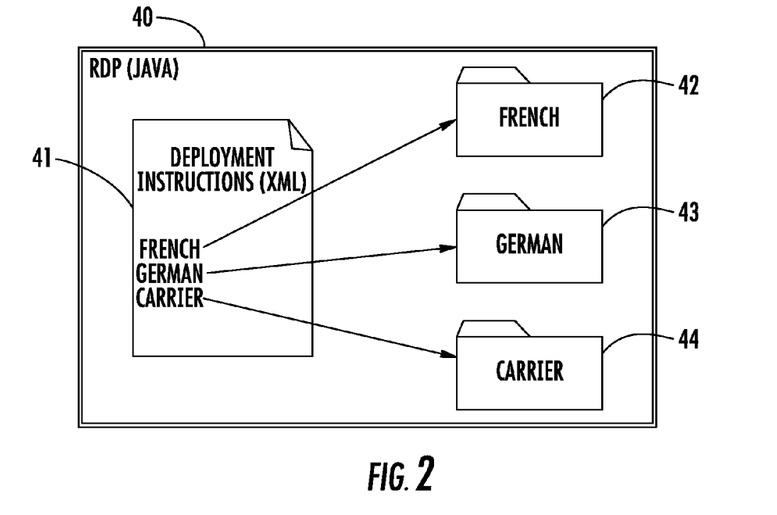
FIG. 2 is a schematic block diagram of a resource deployment package used in the system of FIG. 1.
Figure 3:
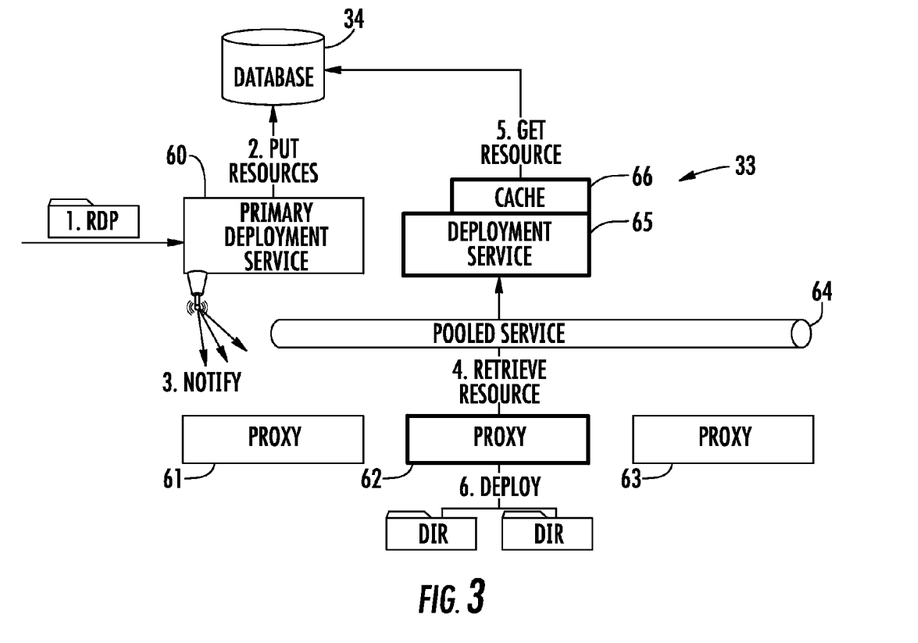
FIG. 3 is a schematic block diagram of an embodiment of the resource deployment server of FIG. 1.
Figure 4:
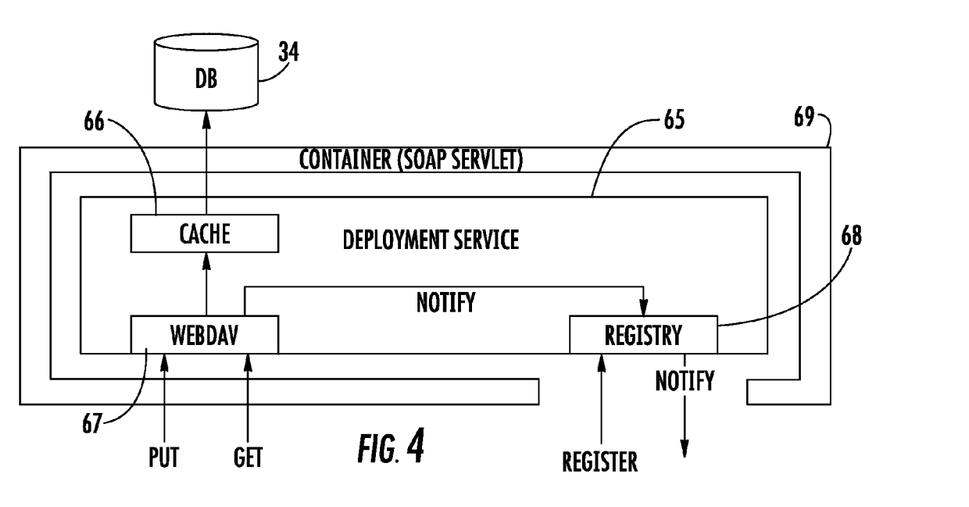
FIG. 4 is a schematic block diagram of an embodiment of a deployment service module of the resource deployment server of FIG. 3.

Turning now additionally to FIGS. 2-4, an exemplary resource deployment server 33 implementation will now be described. The resource deployment server 33 may advantageously enable new languages and wireless communications network resources to be deployed efficiently without requiring component restarts using dynamic deployment of such resources. Generally speaking, each RDP may be a Java package or bundle which includes language specific text or images for use in generating templates, carrier specific software files, images, etc., as well as other resources which may be common to all carrier platforms. For Java packages, the non-carrier specific strings are stored following Java resource file naming conventions. However, it should be noted that formats other than. Java may be used for creating the RDPs, as will be appreciated by those skilled in the art.

In the example described below, non-carrier specific (i.e., non-branded) resource packets are located in a directory com-.server.resources, and these resource packets may include text that is resolved at template translation time. Moreover, resource bundles may also be located within various proxy packages that use them. Such resource bundles may include localized text that is resolved during action handler execution. For example, the text may be injected into an XML document which will be processed by an Extensible Stylesheet Language Transformation (XSLT) to generate localized content. An exemplary list of directories for non-carrier specific bundles is as follows:

com.server.proxy.resource\prov.properties;
com.server.proxy.resource\proxy.properties;
com.server.proxy.html.resource\html.properties;
com.server.proxy.html.resource.ppc\prov.properties;
com.server.proxy.webdav.bda.resource\bda.properties;
com.server.proxy.webdav.davmgmt.resource\davmgmt.properties;
com.server.proxy.admin.resource\admin.properties;
com.server.proxy.pop.resource\pop.properties; and
com.server.proxy.wap.resource\wap.properties.

Additionally, specific carrier resource (i.e., a branded resource) bundles or packages may also be included which, if present, override the common non-carrier specific resources listed above. For example:

com.server.proxy.webdav.davmgmt.resource.carrier\davmgmt.properties;
com.server.proxy.resource.carrier\prov.properties; and
com.server.proxy.resource.carrier\proxy.properties.

When loading a named text string within a named package, the following package precedents may be used to load the string:
1. com.server.proxy.[app].resource.[device].[bundle]
2. com.server.proxy.[app].resource.[brand].[bundle]
3. com.server.proxy.[app].resource.[bundle]
4. com.server.proxy.resource.[device].[bundle]
5. com.server.proxy.resource.[brand].[bundle]
6. com.server.proxy.resource.[bundle]

A particular carrier brand may include a variety of resources such as templates, images, Java resource bundles, and terms and conditions. Brand resources may be located within the configured brand directory, under which there is a particular subdirectory for each brand, e.g., [BrandDir]\[Carrier]. Of course, it should be noted that other directory designations and file arrangements may be used besides those set forth in the present example.

A particular brands subdirectory may also be used that includes subdirectories for each application (e.g., HTML) under which there may be one or more mobile wireless communications device subdirectories. Templates located in these directories may advantageously override those found in a configure template directory, if desired. There may also exist additional templates that extend the base application functionality, as will be appreciated by those skilled in the art. In addition, within a particular brand directory there may be an image directory called "images" including localized images.

Currently localized terms and conditions for the carrier, mobile wireless communications device provider, email service provider, etc. may be located within a subdirectory of the brand. Each term and condition may be a text file with hard-coded names, e.g.:

```
[branddir]\[brand]\bda\en\termsandconditions.txt; and
[branddir]\[brand]\bda\en\carriertandc.txt.
```

Each brand is preferably configured with a particular scheme. Schemes are located with a proxy configured scheme directory. Scheme directories may include non-localized cascading style sheet (CSS) files, as well as localized images, and schemes may be shared by multiple brands.

An RDP may be used to deploy multiple languages and/or carriers/brands. The RDP may be conceptually viewed as a "jar" which includes language and/or carrier resources. The jar allows the resources to be organized and compressed for efficient deployment. Referring to FIG. 2, an exemplary RDP 40 illustratively includes a descriptor file 41 including deployment instructions for a set of French, German, and carrier specific resource files 42-44, respectively. More particularly, the descriptor file 41 includes information about each resource file to be deployed. A resource file includes the resources for a particular language, carrier, etc., and contains the path information so it can be easily expanded into the resource consumer's (i.e., carrier's) file system, as discussed above.

The descriptor file 41 may include XML code which comprises deployment information for each resource jar or file within the RDP. An exemplary schema of the RDP descriptor file 41 is as follows:

```
<?xml version="1.0" encoding="utf-8" ?>
<xs:schema targetNamespace=""
xmlns:xs="http://www.w3.org/2001/XMLSchema">
    <xs:element name="package">
        <xs:complexType>
            <xs:sequence>
                <xs:element name="Resource">
                    <xs:complexType>
                        <xs:attribute name="id"
                            type="xs:ID" />
                        <xs:attribute name="type"
                            type="ResourceType" />
                        <xs:attribute name="jar"
                            type="xs:string" />
                        <xs:attribute name="description"
                            type="xs:string" />
                        <xs:attribute name="dirPropKey"
                            type="xs:string" />
                    </xs:complexType>
                </xs:element>
            </xs:sequence>
```

-continued

```
        </xs:complexType>
    </xs:element>
    <xs:simpleType name="ResourceType">
        <xs:restriction base="xs:string">
            <xs:enumeration value="language" />
            <xs:enumeration value="carrier" />
        </xs:restriction>
    </xs:simpleType>
</xs:schema>
```

A resource element describes one resource file within the RDP 41, and it may include attributes such as those set forth in Table 1, below.

TABLE 1

| Attribute | Type | Description |
|---|---|---|
| id | ID | Uniquely identifies a resource file. Each version of a particular language or carrier resource file will preferably have the same id. For example, each version of the French language resource file 42 should always have the same id. |
| type | ResourceType | This value may be either "language" or "brand", for example. |
| jar | string | The name of the resource file within the RDP 41. |
| description | string | A human readable string describing the given resource file, e.g., "French Language" |
| dirPropKey | string | The name of the directory in which the resource consumer should expand the file into, e.g., "com.server.proxy.schemes" |

The following are exemplary XML deployment instructions for the resource files 42-44. First, exemplary deployment instructions for the French resource file 42 are as follows:

```
<package>
    <resource id="lang-fr" type="language" jar="fr"
        description="French"
        dirPropKey="server.proxy.resources.dir"/>
    <resource id="lang-fr-carrier" type="language" jar="fr-carrier"
        description="French Carrier"
    dirPropKey="server.proxy.resources.dir"/>
</package>
```

Of course, the descriptor XML code for the German language file 43 would be similar to the French XML code. Exemplary descriptor XML code for the carrier file 44 (i.e., CarrierA) is as follows:

```
<package>
    <deploy type="brand" id="br-CarrierA" jar="CarrierA"
        desc="CarrierA wireless"
        dirProp="server.proxy.brand.directory"/>
</package>
```

Exemplary RDP contents for the French language file 42 are as follows:

```
rdp001.jar
    descriptor.xml
    fr.jar
        admin_fr.properties         com.server.resources
        bda_fr.properties           com.server.resources
        device_fr.properties        com.server.resources
        calendar_fr.properties      com.server.resources
        common_fr.properties        com.server.resources
        defaultbrand_fr.properties  com.server.resources
        carrier_fr.properties       com.server.resources
    fr-carrier.jar
        prov.properties             com.server.proxy.resource.carrier
        davmgmt.properties          com.server.proxy.webdav.davmgmt.resource.carrier
        proxy.properties            proxy.propertiescom.server.proxy.resource.carrier
```

The following are exemplary use cases that may be considered in the design of the resource deployment system. More particularly, these are use cases that the system may need to accommodate in certain implementations. However, it will be appreciated that not all of these exemplary use cases need to be accommodated in all embodiments, and other use cases may be accommodated as well. One exemplary use is when a new language or carrier needs to be added to the system. Another use case is when a new instance of a component is added to the system that has little or no resources and needs to be able to retrieve missing resources.

Moreover, a component may be "down" and therefore require re-starting. While the component is down it may miss one or more new resource notifications, and the component will preferably have the ability to check for updated RDPs and deploy the RDPs accordingly. Additionally, if an account is of carrier/brand X and that brand's resources are not present, then the appropriate resources will need to be retrieved for deployment. Another example is when a language or carrier resource has been modified, which requires a resource to be redeployed, either while the system is running or during a maintenance period, depending upon the particular resource. In addition, still another use case to consider is version consistency across components. More particularly, when a new version of a resource is introduced, it is generally desirable to make sure that different instances do not end up deploying different versions of resources.

Referring now to FIG. 3, an external system/process (e.g., programmers/developers) provide RDPs to a primary deployment service (DS) module 60 within the resource deployment server 33. The primary DS module 60 makes the resources available and ensures that each component of the system (i.e., carriers) is made aware of the resource. To ensure a timely deployment of the resource, the appropriate components are preferably notified of the resource's existence. Moreover, these components may also poll the resource deployment server on a timely basis if notifications are not used, for example.

Notifications require that each interested party is known before hand, while polling may require more network resources. Accordingly, the particular choice for using polling and/or notifications will depend upon the given implementation. However, it should be noted that with a purely polling approach the primary deployment service module may potentially be eliminated. It should be noted the various components and modules of the resource deployment server 33 are shown as separate components within a single server for clarity of illustration. However, in some embodiments the functions of such components may be implemented by common hardware and/or software components, and the various functions may also be distributed across more than one server or computing platform, as will be appreciated by those skilled in the art.

Whenever a carrier component is added to the system or has been re-started, there exists a chance that this component does not have all the resources it requires. In such cases, the component may synchronize with the currently deployed updates. Such a process can be used to update resources during maintenance windows (shutdowns), when re-starting following a failure, when a brand resource is missing, or if polling is employed for new resource detection, for example.

The various components and processes used for deploying an RDP are now further described. First, an RDP is constructed and sent to the primary DS module 60, as noted above. The primary DS module 60 stores the RDAs in the database 34, and notifies all interested proxies 61-63 of the new resources. One or more of the proxies 61-63 retrieves the resource via a deployment service pool 64. By way of example, the deployment service pool 64 may include all instances of the DS modules. When a resource consumer has been notified of a new resource or has determined via the synchronization process that it needs to retrieve a resource, it connects to a DS via a load balancer ("BigIP") that will load balance the request to one of the DS modules where multiple DS modules are used.

A secondary DS module 65 checks its cache 66 for the requested RDP and, if it is not available in the cache, retrieves the RDP from the database 34 and caches it. Furthermore, the RDP is returned by the secondary DS module 65 to the given proxy via the deployment service pool 64, and the given proxy then deploys the deployment content within the RDP based upon the deployment instructions.

One or more of the DS modules are preferably used by the resource consumers to retrieve resources, and it is done via a single IP, which is the BigIP pool that load-balances requests across all DS modules. The primary DS module 60 plays a special role in that consumers register with it to retrieve notifications of new resources, all RDPs are deployed via this DS module. The secondary DS module 65 plays a special role in that the primary DS module 60 forwards all RDPs deployed to it so that if the primary goes down the consumers and other DS modules can still retrieve the resources. One or more "cache only" DS modules may also be included which do not necessarily play any special role. A cache only DS module's only job is to simply retrieve resources for the consumer. If it does not have the resource in its cache it will retrieve it from the primary DS module 60, and if the primary DS module is down then it will retrieve the resource from the secondary DS module 65. Once the resource is retrieved it will be cached and returned to the resource consumer(s). All DS modules preferably have a cache 66, although the primary DS module cache is not shown in FIG. 3 for clarity of illustration. It should also be noted that while the various components of the system illustrated in. FIG. 3 are shown as separate components, they may in fact be implemented using common hardware (e.g., memories, processors) and software, and the DS modules may all have substantially the same structures in some embodiments although they may be assigned special tasks as noted above. As such, various numbers of DS modules can be used to advantageously provide scalability based upon the particular implementation.

The RDP may be sent to the primary DS module via a console, script or utility application, for example. More particularly, two specific mechanisms that may be used for delivery of RDPs to the primary DS module are as follows. First, a client tool may "rcopy" the RDP to a well-known deployment directory. The primary DS module 60 may then detect the RDP and begin the deployment process, as discussed further above. By way of example, the client tool may use a World Wide Web Distributed Authoring and Versioning (WebDAV) interface 67 implemented by the secondary DS module 65 to send the RDP, which starts the deployment process. Of course, it will be appreciated by those skilled in the art that other deployment mechanisms may also be used. Moreover, a registry 68 may also communicate with the WebDAV interface 67 and proxies 61-63 to perform register and notify operations, as shown.

As noted above, the DS modules 60, 65 are responsible for receiving RDPs, persisting resources, notifications to interested components, retrieving resources, and providing synchronization information, for example. A container 69 may advantageously be used in some embodiments to provide an environment for the DS modules 60, 65 to execute. By way of example, the container 69 may be a Simple Object Access Protocol (SOAP) servlet. A SOAP servlet may advantageously provide an HTTP listener for a WebDAV request, as well as a pool of database connections. Moreover, since the SOAP servlet is a pooled resource, the DS module(s) becomes a pooled resource as well.

The cache 66 stores resources locally within the DS module 65. If the requested resource does not exist in the cache 66, then it is retrieved from the database 34, as noted above. The resources may be stored in a configured directory as RDPs, for example. An index is also preferably created that tracks which resources are in the cache 66. The cache 66 also provides a mechanism that returns a set of existing resources, which utilizes a query to the database 34. This will enable a synchronization request to be completed, as will be appreciated by those skilled in the art.

The container 69 may be configured to route WebDAV requests to the database 34. The WebDAV component 67 processes the request, which may be one of three, for example. The first request may be a "put" RDP request, which stores an RDP in the local cache 66 and in the database 34, and the registry is notified accordingly. The second request is a retrieve resource request, which for a given resource key retrieves the appropriate resource. The third request is a synchronize request. A search of the root folder will return a list identifying available resources. The list will include the resource ID and its version ID. The client (e.g., carrier network component) will use this information to determine which resources to download.

Each component interested in receiving new resources may register with the primary DS module 60. Registration may simply include keeping a socket open via which notifications can be sent, as will be appreciated by those skilled in the art. A notification may include a WebDAV Uniform Resource Identifier (URI) to retrieve an RDP, for example.

The database 34 is used to persist and propagate resources on-demand to other deployment service instances. By way of example, a resource table(s) may be created that stores the following information:

| Name | Type |
| --- | --- |
| id (unique, key) | X characters (e.g., 64) |
| versionid | long id |
| RDP | This may be a single jar with a descriptor file, or descriptor values may be added. |

Stored procedures may be created to store a resource, to retrieve a resource, and to retrieve a list of all resources.

By way of example, each resource consumer, such as the proxies 61-63, may have the following responsibilities: (1) synchronize resources at startup; (2) maintain a registry of deployed resources; (3) listen for resource notifications; and (4) retrieve and deploy resources. In some instances, it may be desirable to deploy updated resources at scheduled maintenance periods when resource consumers will be stopped and started to avoid causing different versions of the same resource to be in-use at the same time.

The following steps may be taken to update resources to avoid this problem: (1) stop the service; (2) if using rcopy, then go to step 6; (3) start primary deployment service; (4) send updated RDPs via WebDAV; (5) go to step 8; (6) rcopy RDPs to the primary DS directory; (7) start the primary deployment service; and (8) restart the components, which will now synchronize their content. The updated resources may be introduced during a planned maintenance period during which the resource consumers may be restarted, for example.

From the foregoing description, it will be appreciated that the resource deployment system set forth herein may provide the following advantages. First, the resource deployment server 33 may dynamically deploy new languages. That is, it provides a relatively straightforward process for deploying a new language bundle to a running installation, without requiring the component to be restarted. The server 33 may also be used for dynamically deploying new carriers, as it provides a relatively straightforward process for introducing a new carrier bundle to a running installation, without requiring the component to be restarted. Moreover, it further provides centralized access to carrier RDPs, while providing a programmatic mechanism to retrieve and inspect a carrier bundle through the centralized service.

Figure 5:
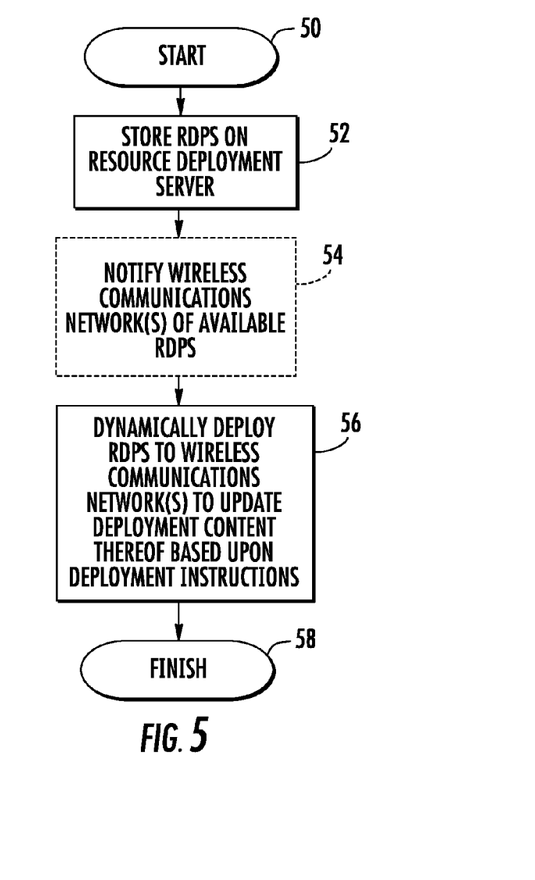
FIG. 5 is a flow diagram illustrating a method in accordance with the present invention.

Turning now to FIG. 5, a wireless communications method aspect illustratively begins at Block 50 with storing a plurality of resource deployment packages (RDPs) on a resource deployment server 33, at Block 52. Each RDP may include deployment content and deployment instructions therefor relating to sending and receiving email messages between a plurality of mobile wireless communications devices 31*a*-31*m*, 31*n*-31*z* and a plurality of respective wireless communications networks 32*a*, 32*n*, as noted above. The method further illustratively includes dynamically deploying RDPs from the resource deployment server 33 to the wireless communications networks 32*a*-32*n* to update deployment content thereof based upon the respective deployment instructions, at Block 56, thus concluding the illustrated method (Block 58). As noted above, in some embodiments the resource deployment server 33 may optionally notify the wireless communications networks of available RDPs (Block 54).

Figure 7:
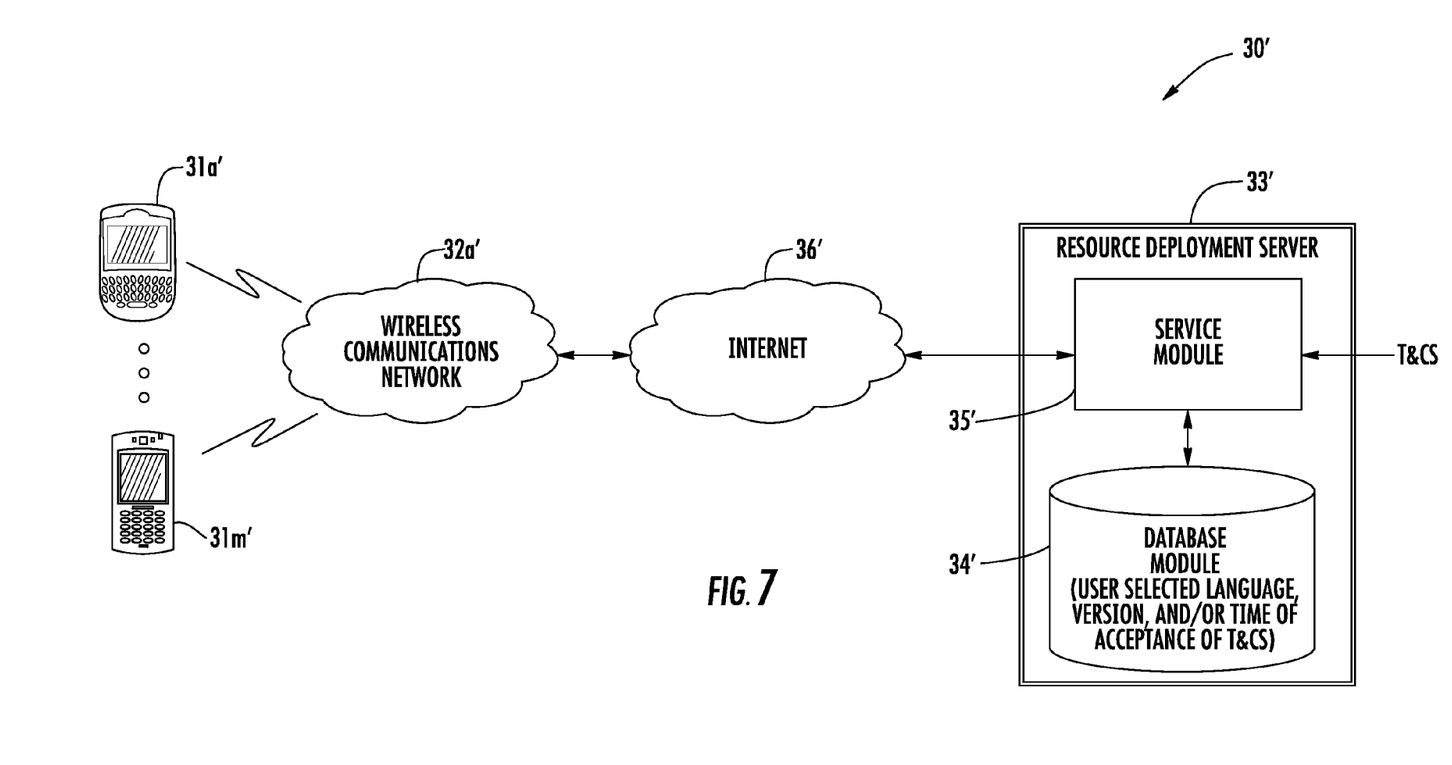
FIG. 7 is a schematic block diagram of an alternative embodiment of the system of FIG. 1 providing terms and conditions update features.
Figure 8:
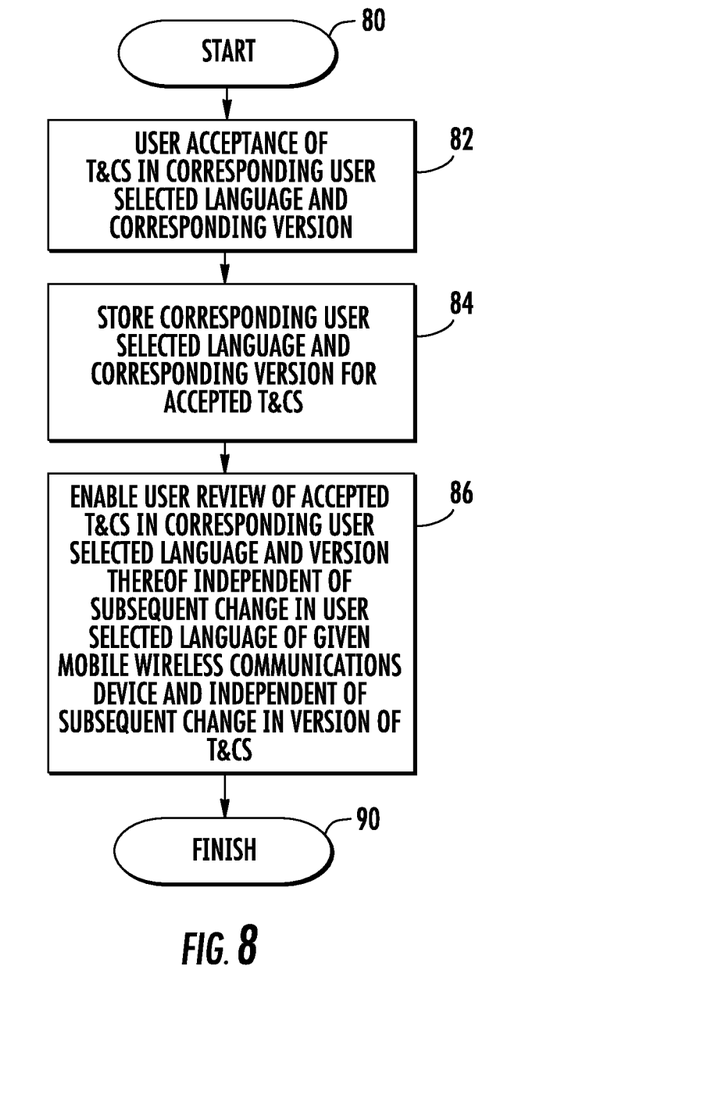
FIGS. 8-9 are flow diagrams illustrating method aspects for the system of FIG. 7.
Figure 9:
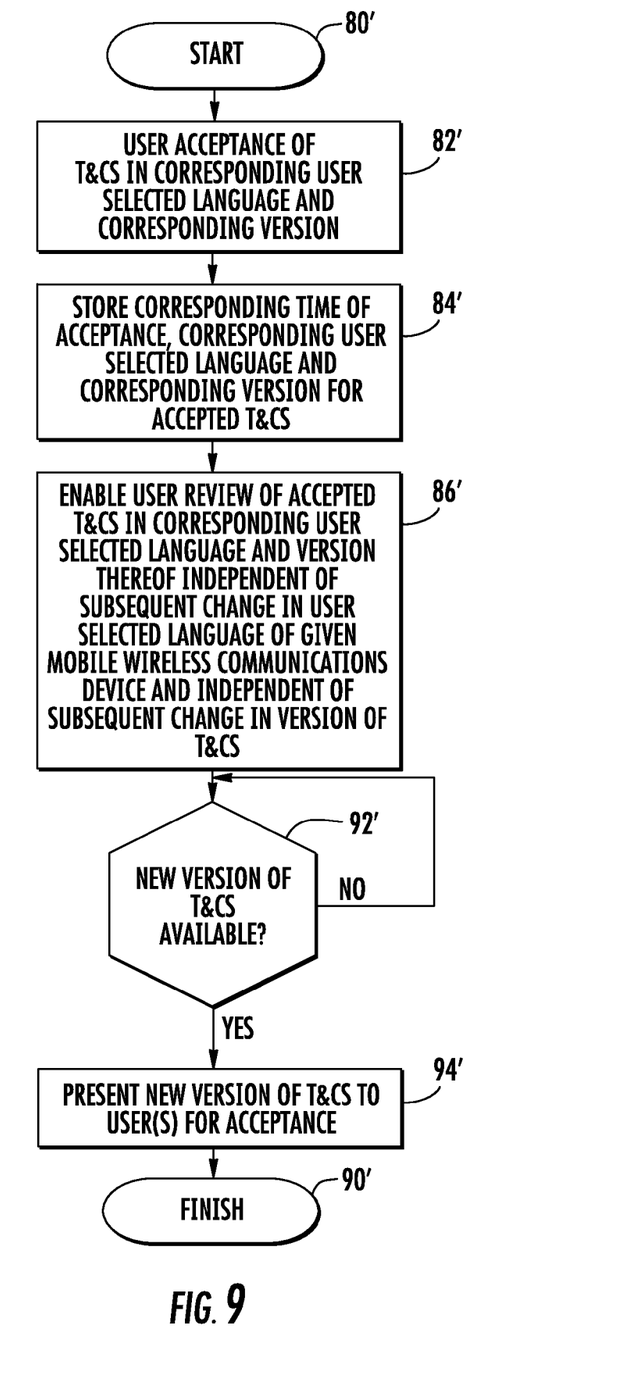

Referring now additionally to FIGS. 7-9, beginning at Block 80, each wireless communications device 31*a*'-31*m*' is typically enabled for email communication in the system 30' upon accepting terms and conditions (T&Cs) of use (Block 82), as will be appreciated by those skilled in the art. For a multi-national or multi-lingual system deployment, the T&Cs can be accepted in different languages selected or designated by the user. Moreover, as noted above, resources such as T&Cs typically change from time to time. Accordingly, as new users are added to the system 30', they may accept different versions of the T&Cs than prior users, and of at different times.

As such, it may be desirable in certain embodiments to account for which users have accepted which versions of the T&Cs, in what languages the T&Cs were accepted, and/or when the T&Cs were accepted. Such information may be important for legal and/or other reasons, as well as for providing users access to the specific T&Cs they have agreed to, if desired. Accordingly, in the present embodiment the database module 34' may advantageously store the corresponding time of acceptance (which may include minute, hour, date, year, etc., information) of the T&Cs, the corresponding user selected language, and/or the version for the accepted T&Cs for each user, at Blocks 84, 84'.

The service module 35' may therefore advantageously cooperate with the database module 34' for enabling user review of the accepted T&Cs in the corresponding user selected language and version thereof, and independent of any subsequent change in the user selected language of a given mobile wireless communications device 31' and independent of any subsequent change in version of the T&Cs, at Block 86, thus concluding the method illustrated in FIG. 8 (Block 90). That is, the service module 35' can therefore provide users with the specific version of the T&Cs they agreed to, in the language they were agreed to, and the time at which the T&Cs were accepted. The user could request access to the T&Cs via his/her handheld device 31', via a computer (not shown) connected to the Internet 36', etc.

In accordance with one embodiment, at any point that a user's account is active, the user may be shown an option to see the T&Cs that he/she has accepted. This is done by referencing a version number stored in a corresponding account for the user in the database module 34', and retrieving the appropriate stored version of the T&Cs accordingly. Since this is done in the original language in which the T&Cs were accepted, if a user originally accepted the T&Cs in French and at some later point changed his device-selected language preference to English, when the user requests to review the agreed-to T&Cs they will appear in French (although they could be presented in alternative languages, such as English, in some embodiments, if desired).

Another advantageous feature is that the service module 35' may also present new versions of T&Cs to users via respective mobile wireless communications devices 31' for acceptance thereof, and update the database module 34' based thereon, at Blocks 92', 94'. In one exemplary embodiment, when a new version of T&Cs is stored in the database module 34', the service module 35' determines if a given user has accepted an older version of the T&Cs and, if so, requires the user to accept the new T&Cs before he is allowed to continue using the system 30'. Of course, in some embodiments reminders and grace periods could be implemented so that a user is not immediately removed from the system 30', if desired. It should be noted that more than one resource deployment server 33' and/or service module 35' and database module 34' may be used in different embodiments.

One example of a hand-held mobile wireless communications device 1000 that may be used in accordance the system 20 is further described in the example below with reference to FIG. 6. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 6:
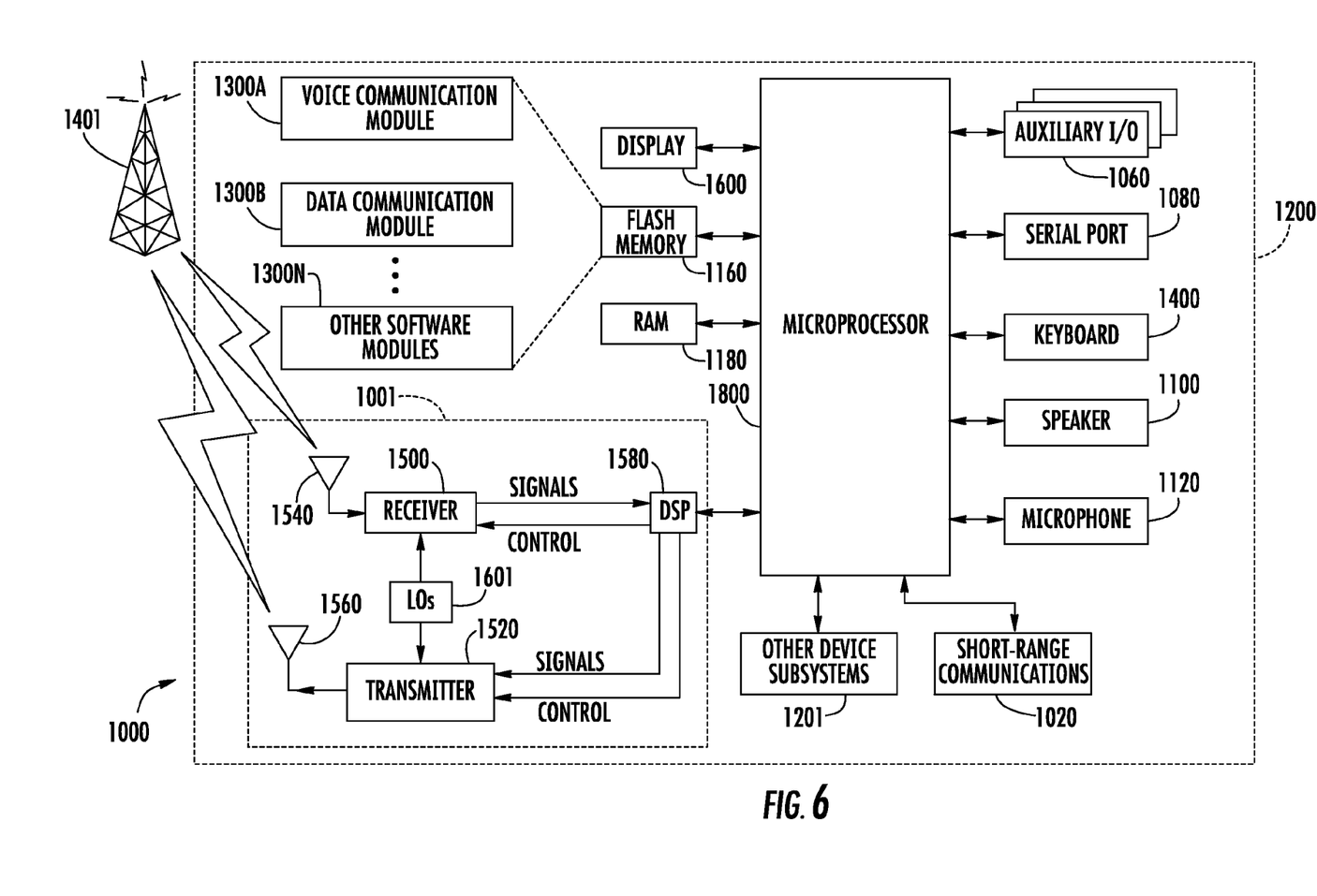
FIG. 6 is a schematic block diagram illustrating exemplary components of a mobile wireless communications device for use with the present invention.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

Exemplary components of a hand-held mobile wireless communications device 1000 that may be used in accordance the system 30 is further described in the example below with reference to FIG. 14. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 14. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device.

The composed data items may then be transmitted over the communications network 1401 via the communications subsystem 1002.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
a plurality of mobile wireless communications devices, each mobile wireless communications device including non-transitory memory storing program instructions that when executed by a processor enable receipt of data reflective of terms and conditions (T&Cs) for use of the mobile wireless communications device and enable communication based upon acceptance of the T&Cs in a corresponding version at a time of acceptance for use of the mobile wireless communications device; and
a server comprising non-transitory memory storing program instructions that when executed by a processor cause the server to:
store data reflective of the corresponding version of the accepted T&Cs for each of the mobile wireless communications devices;
enable review of the corresponding version of the accepted T&Cs for each of the mobile wireless communications devices; and
deploy the T&Cs in respective resource deployment packages (RDP) for different languages over at least one wireless network over which the wireless communications devices communicate with the server, wherein each RDP further comprises deployment instructions for the at least one wireless network.

2. The wireless communications system of claim 1 wherein each of the mobile wireless communications devices is configured to enable communication further based upon acceptance of the T&Cs in a corresponding language; and
wherein the server is configured to store and enable review of the corresponding language of the accepted T&Cs for each of the mobile wireless communications devices.

3. The wireless communications system of claim 1 wherein the server is configured to send data reflective of new versions of T&Cs to respective wireless communications devices to present the new versions of T&Cs on the respective wireless communications devices for acceptance thereof.

4. The wireless communications system of claim 1 wherein the server is configured to store a corresponding time of acceptance for the T&Cs, and enable review of the corresponding time of acceptance.

5. The wireless communications system of claim 1 wherein at least some of the mobile wireless communications devices comprise cellular devices.

6. The wireless communications system of claim 1 wherein the server is configured to interface with the at least one wireless network.

7. The wireless communications system of claim 1 wherein the server further comprises a World Wide Web Distributed Authoring and Versioning (WebDAV) interface.

8. A cellular communications system comprising:
a plurality of cellular communications devices, each cellular communications device including non-transitory memory storing program instructions that when executed by a processor enable receipt of data reflective of terms and conditions (T&Cs) for use of the cellular communications device and enable communication based upon acceptance of the T&Cs in a corresponding version at a time of acceptance for use of the cellular communications device; and
a server comprising non-transitory memory storing program instructions that when executed by a processor cause the server to:
store data reflective of the corresponding version of the accepted T&Cs for each of the cellular communications devices;
enable review of the corresponding version of the accepted T&Cs for each of the cellular communications devices;
send data reflective of new versions of T&Cs to respective cellular communications devices to present the new versions of T&Cs on the respective cellular communications devices for acceptance thereof; and
deploy the T&Cs in respective resource deployment packages (RDP) for different languages over at least one wireless network over which the wireless communications devices communicate with the server, wherein each RDP further comprises deployment instructions for the at least one wireless network.

9. The cellular communications system of claim 8 wherein each of the mobile wireless communications devices is configured to enable communication further based upon acceptance of the T&Cs in a corresponding language; and
wherein the server is configured to store and enable review of the corresponding language of the accepted T&Cs for each of the mobile wireless communications devices.

10. The cellular communications system of claim 8 wherein the server is configured to store a corresponding time of acceptance for the T&Cs, and enable review of the corresponding time of acceptance.

11. A server configured to cooperate with a plurality of mobile wireless communications devices, each mobile wireless communications device including non-transitory memory storing program instructions that when executed by a processor enable receipt of data reflective of terms and conditions (T&Cs) for use of the wireless communications device and enable communication based upon acceptance of the T&Cs in a corresponding version at a time of acceptance for use of the mobile wireless communications device, the server comprising:
a processor and non-transitory memory storing program instructions, that when executed by the processor, cause the server to:

store data reflective of the corresponding version of the accepted T&Cs for each of the mobile wireless communications devices; and enable review of the corresponding version of the accepted T&Cs for each of the mobile wireless communications devices; and deploy the T&Cs in respective resource deployment packages (RDP) for different languages over at least one wireless network over which the wireless communications devices communicate with the server, wherein each RDP further comprises deployment instructions for the at least one wireless network.

12. The server of claim 11 wherein each of the mobile wireless communications devices is configured to enable communication further based upon acceptance of the T&Cs in a corresponding language; and wherein the processor and memory are configured to store and enable review of the corresponding language of the accepted T&Cs for each of the mobile wireless communications devices.

13. The server of claim 11 wherein the processor and memory are configured to send data reflective of new versions of T&Cs to respective wireless communications devices to present the new versions on the respective wireless communications devices for acceptance thereof.

14. The server of claim 11 wherein the processor and memory are configured to store a corresponding time of acceptance for the T&Cs, and enable review of the corresponding time of acceptance.

15. A wireless communications method for a plurality of mobile wireless communications devices, each mobile wireless communications device including non-transitory memory storing program instructions that when executed by a processor enable receipt of data reflective of terms and conditions (T&Cs) for use of the mobile wireless communications device and enable communication based upon acceptance of the T&Cs in a corresponding version at a time of acceptance for use of the mobile wireless communications device, the method comprising:

operating a server comprising non-transitory memory storing program instructions that when executed by a processor cause the server to:

store data reflective of the corresponding version of the accepted T&Cs for each of the mobile wireless communications devices;

enable review of the corresponding version of the accepted T&Cs for each of the mobile wireless communications devices; and deploy the T&Cs in respective resource deployment packages (RDP) for different languages over at least one wireless network over which the wireless communications devices communicate with the server, wherein each RDP further comprises deployment instructions for the at least one wireless network.

16. The method of claim 15 wherein each of the mobile wireless communications devices is configured to enable communication further based upon acceptance of the T&Cs in a corresponding language; and wherein operating the server comprises operating the server to store and enable review of the corresponding language of the accepted T&Cs for each of the mobile wireless communications devices.

17. The method of claim 15 wherein operating the server comprises operating the server to send data reflective of new versions of T&Cs to respective wireless communications devices to present the new versions of T&Cs on the respective wireless devices for acceptance thereof.

18. The method of claim 15 wherein operating the server comprises operating the server to store a corresponding time of acceptance for the T&Cs, and enable review of the corresponding time of acceptance.

* * * * *